United States Patent [19]

Hwang et al.

[11] 4,070,322

[45] Jan. 24, 1978

[54] INK COMPOSITION FOR JET PRINTING ONTO NON-ABSORBENT SURFACES

[75] Inventors: Ki-Sup Hwang, Chicago; Daniel M. Zabiak, Park Ridge, both of Ill.

[73] Assignee: A. B. Dick Company, Niles, Ill.

[21] Appl. No.: 654,076

[22] Filed: Feb. 2, 1976

[51] Int. Cl.² .................... C09D 11/10; C08L 31/04; C08L 33/02
[52] U.S. Cl. ...................... 260/29.6 R; 106/22; 260/29.6 H; 260/29.6 HN; 260/30.2; 260/32.8 R; 260/DIG. 38
[58] Field of Search ...................... 106/22; 260/32.8 R, 260/29.6 R, 29.6 H, 29.6 HN, 30.2, DIG. 38

[56] References Cited

U.S. PATENT DOCUMENTS 3,912,520   10/1975   Miyajima et al. ...................... 106/22

OTHER PUBLICATIONS

IBM Technical Disclosure Bulletin, vol. 16, No. 6, (Nov. 1973).

*Primary Examiner*—Stanford M. Levin
*Attorney, Agent, or Firm*—McDougall, Hersh & Scott

[57] ABSTRACT

An ink composition for jet printing onto non-porous-non-absorbent surfaces based upon a ketone solvent having a soluble ionizable salt and a dyestuff and which may contain in addition water in an amount up to 10% by weight, a lower alcohol in an amount up to 8% by weight, a pyrrolidone in an amount up to 4% by weight, a carbitol in an amount up to 4% by weight and a vinyl acetate copolymer resinous binder in an amount up to 6% by weight, the jet printing ink composition having a viscosity within the range of 1.5 to 10 cps, a resistance less than 2000 ohm-cm, a surface tension less than 28 dyne/cm, a velocity of sound within the range of 1200–1700 m/sec, and an upper limit of 5 microns and preferably 2 microns insolubles.

15 Claims, No Drawings

INK COMPOSITION FOR JET PRINTING ONTO NON-ABSORBENT SURFACES

This invention relates to an ink composition suitable for use with jet printers for inscribing onto surfaces which are non-absorbent or not readily wet by water.

In the copending applications Ser. No. 571,215, filed Apr. 24, 1975, and entitled "Printing Ink Composition for Jet Printing on Glazed Ceramic Surfaces", and Ser. No. 590,802, filed June 27, 1975, and entitled "Printing Ink Composition for Jet Printing on Glazed Ceramic Surfaces", description is made of compositions suitable for meeting the specifications for jet printing ink for use with present technology. Such ink compositions depend upon the use of a vehicle having a water base in which the various components of the ink composition are soluble. While water based jet printing ink compositions are suitable for jet printing onto paper or other surfaces onto which the ink can be readily absorbed for fast drying, they have not been found to be suitable for use in jet printing onto non-porous, non-absorbent surfaces such as glass, metals, plastics, ceramics or the like surfaces, or surfaces coated and/or laminated with plastic, metal, glass or synthetic resinous materials, or surfaces which are characterized by hydrophobic, water repellent properties, such as an oily, lubricated, or surfaces having a coating of lubricant or parting compound which remains on the surface after molding.

There are a number of reasons why such water based jet printing inks have been found to be unsuitable for use in jet printing onto such surfaces. Included is the inability of such water based ink compositions to wet out such surfaces with the result that surface tension causes the ink to collect into droplets and produce characters of very poor definition.

In the absence of absorption into the surface for establishing a strong, physical bond, reliance must be had upon chemical forces to establish a strong bonded relationship between the dried ink composition and the non-absorbent, non-porous surface onto which it is applied. The necessary chemical bond is incapable of being established between water based ink compositions and the surface with the result that the applied characters can literally be wiped or washed off of the surface. Finally, by reason of the lack of absorption into the surface, drying depends upon evaporation of the water, with the result that the ink characters dry so slowly as to reduce their utility for present high character speed technology in jet printing.

Attempts have been made to overcome deficiencies such as rapid drying, surface tension, and adhesion by replacement of water with alcohol. However, while such alcoholic inks reduce some of the inefficiencies, such as rate of drying and high surface tension, they remain insufficient from the standpoint of adhesion of the dried ink characters onto surfaces of the types described.

Thus it is an object of this invention to produce a jet printing ink composition which is characterized by fast drying, low surface tension and good wet-out and adhesion to non-porous, non-absorbent surfaces, and it is a further object of this invention to produce jet printing inks of the type described which are further characterized by the requirements of an ink composition suitable for jet printing, namely, a viscosity within the range of 1.5 to 10 cps, a resistivity below 2000 ohm-cm, a velocity of sound of 1200–1700 m/sec, and insolubles of less than 5 microns in size, as well as good rub resistance and fast drying.

More specifically, it is an object of this invention to produce a jet printing ink composition formulated of a vehicle having an organic solvent base, good wet-out of non-porous — non-absorbent surfaces, and good adhesion when dried to such non-absorbent — non-porous surfaces, such as surfaces of metals represented by iron, steel, tin plate, copper and the like; surfaces formed of plastic or synthetic resinous materials such as polyethylene, cellulose resins, epoxy resins, vinyl polymers and copolymers, polyesters, polyamides, polyacrylic or polyalkylacrylic resins, acetal resinous polymers, phenolic resins, butadiene-styrene copolymer resins and the like; glass, glazed ceramics and the like surfaces, as well as surfaces having a coating of such materials, or coated with residual parting or lubricating compound used in molding products having a surface to be printed or coded with ink composition by the jet printing technique.

Ink compositions suitable for printing on such surfaces to provide a water insoluble, rub resistant, well bonded imprint are well known but such known ink compositions are not compatible with the jet printing process from the standpoint of viscosity, resistance, and particulate matter, as heretofore described.

It has been found, in accordance with the practice of this invention, that the desired objectives in a printing ink composition suitable for jet printing onto surfaces of the types described can be prepared when use is made of a vehicle formulated predominantly of a ketone, in the form of an aliphatic ketone, represented by acetone, methyl ethyl ketone, methyl isobutyl ketone, and preferably an aliphatic ketone having up to 10 carbon atoms in straight chain arrangement, or an alicyclic ketone such as cyclopentanone, cyclohexanone, methyl isobutyl ketone or other alicyclic ketone having up to 10 carbon atoms.

Ketone based jet printing ink compositions of this invention are characterized by lower surface tension by comparison with water based inks and they are better able to wet out hydrophobic surfaces and avoid gathering of the applied ink composition into droplets on the surface. The presence of such ketones, as a predominant proportion of the diluent, enables the applied ink composition, while wet, to act upon the surfaces formed of synthetic resinous materials or plastics to cause softening or swelling whereby stronger and more permanent adhesion of the dried ink characters can be obtained to the printed surface. In addition, such ketone solvent components are highly volatile thereby to permit rapid drying when applied to non-porous — non-absorbent surfaces.

Unlike the strongly hydrogen bonded diluents, such as alcohol and water, wherein the desired conductivity levels can be obtained merely by the addition of the dye component, the ketones embodied in the formulation of the jet printing ink compositions of this invention are only moderately hydrogen bonded solvents such that it becomes necessary to incorporate a solvent soluble, ionizable salt into the ink composition in order to acquire the necessary conductivity.

Representative of solvent soluble ionizable salts that may be used are the alkali metal and alkaline earth metal halides, such as sodium, potassium and ammonium chloride, ammonium nitrate, alkali metal thiocyanates such as sodium, potassium and ammonium thiocyanate, alkali metal alkylates such as sodium, potassium or ammonium acetates. The desired results are secured when the soluble ionizable salts are present in the ink composition in an amount of at least 0.25% by weight of the ink composition. No added benefit is derived when the amount of ionizable salt exceeds 2% by weight. In the preferred practice of the invention, it is desirable to make use of the ionizable salt component in an amount within the range of 0.5 to 1.0% by weight of the ink composition.

The jet printing ink should produce an ink image which, upon drying, is water insoluble, yet the ink composition itself should be water tolerant to enable operation under highly humid conditions without undesirable effect on the stability of the ink system. In fact, the conductivity of the jet ink composition of this invention is benefitted by the presence of a small amount of water, either added intentionally or absorbed from the air when operating under high humidity conditions. The amount of water present in the ink composition should not exceed 10% by weight of the ink composition and it is preferred to restrict the amount of water to within the range of 0 to 5% by weight.

Further improvement of the jet printing ink of this invention, from the standpoint of adhesion in the substrate can be achieved by the formulation of the jet printing ink composition to include a vinyl acetate copolymer resinous component selected from the group consisting of vinyl acetate — vinyl chloride copolymer, such as is available from Union Carbide Chemical Company under the trade designations VINYLITE VYHH, VYHD, VYLF, VYNS, VYNW, VAGH, VAGD, VMCH, VMCC, VMCA and VERR; and vinyl acetate — crotonic acid copolymers such as the type marketed by Monsanto Chemical Company under the designations Gelva C3V10, C3V20, C3V30, C5V10, and C5V16.

The desired improvement in adhesion is not obtained by the use of vinyl acetate homopolymer, vinyl chloride homopolymer, while other vinyl acetate copolymers such as vinyl acetate - ethylene copolymer are not sufficiently soluble in the ketone based ink composition to enable their use.

Although not essential to the ink composition, the presence of vinyl acetate copolymer provides for improved adhesion. When present, it is undesirable to formulate the jet printing ink with more than 6% by weight of the resinous binder component. In general, the vinyl acetate copolymer is formulated into the ink composition in an amount within the range of 0 to 6% by weight and preferably within the range of 2 to 4% by weight.

Even when such additional resinous binder component is present in the printing ink composition, good adhesion is not obtained on surfaces formed of polyester resins (Dacron), polyamide resins (Nylon), polytetrafluoroethylene resins (Teflon), or silicone resins. Because the ink is applied by liquid spray from a jet nozzle, the character of the surface is not important in that the jet printing ink composition of this invention can be printed onto surfaces which are flat, concave, convex, terraced, embossed, rippled, and the like. The ink jet stream can reach into surface irregularities where conventional printing means fail.

Having described the basic concepts of the invention, illustration will now be made of examples of ink compositions representative of the practice of this invention.

EXAMPLE 1

| | |
|---|---|
| Methylethyl ketone | 80.7% |

EXAMPLE 1-continued

| | |
|---|---|
| N-Methyl-2-Pyrrolidone | 2.0 |
| Diethylene Glycol Ethyl Ether | 2.1 |
| Water | 5.0 |
| Vinyl acetate - vinyl chloride copolymer (Vinylite VMCH) | 2.3 |
| Polyvinyl butyral (Vinylite XYHL) | .9 |
| Solvent soluble ionizable salt (potassium thiocyanate) | 1.0 |
| Rhodamine B Base | 1.0 |
| Ethyl Alcohol | 5.0 |

The ingredients are merely combined to form a solution. The ink composition has good imaging characteristics and good rub resistance when printed onto metal or plastic surfaces by jet printing.

EXAMPLE 2

| | |
|---|---|
| Methyl Isobutyl ketone | 78.7% |
| N-Methyl-2-Pyrrolidone | 2.0 |
| Diethylene Glycol Ethyl Ether | 2.1 |
| Water | 5.0 |
| Ethyl Alcohol | 7.0 |
| Vinyl acetate - vinyl chloride copolymer (Vinylite VMCH) | 2.3 |
| Polyvinyl butyral (Vinylite XYHL) | .9 |
| Solvent soluble ionizable salt (potassium thiocyanate) | 1.0 |
| Rhodamine B Base | 1.0 |

The ingredients are combined into a solution in any order. The ink composition, which is similar to that of Example 1, except for the substitution of methyl isobutyl ketone for methyl ethyl ketone, has improved adhesion to can lids heavily coated with a mold release lubricant.

EXAMPLE 3

| | |
|---|---|
| Methyl Isobutyl ketone | 63.2% |
| Methylethyl ketone | 17.0 |
| vinyl acetate - vinul chloride copolymer (Vinylite VMCH) | 4.0 |
| N-Methyl-2-Pyrrolidone | 2.0 |
| Diethylene Glycol Ethyl Ether | 2.8 |
| Methyl Alcohol | 9.5 |
| Solvent soluble ionizable salt (potassium thiocyanate) | .5 |
| Methyl Violet Base | 1.0 |

This example illustrates an ink composition of this invention in which water is absent as a component. It has a viscosity of 2.55 cps, a resistance of 2500 ohm-cm and is easily jet printable.

EXAMPLE 4

| | |
|---|---|
| Methyl Isobutyl ketone | 63.5% |
| Methyl Ethyl ketone | 15.0 |
| Vinyl acetate - vinyl chloride copolymer (Vinylite VMCH) | 3.7 |
| N-Methyl-2-Pyrrolidone | 2.0 |
| Diethylene Glycol Ethyl Ether | 2.5 |
| Water | 5.0 |
| Methyl Alcohol | 6.5 |
| Solvent soluble ionizable salt (potassium thiocyanate) | .8 |
| Methyl Violet Base | 1.0 |

This ink composition, which is similar to that of Example 3, except for the addition of 5.0% by weight water, has a viscosity of 2.56 cps, and a resistance of 660 ohm-cm. Jet printing was good and the dried printed image has good rub resistance on all surfaces including surfaces having a coating of a mold release agent.

EXAMPLE 5

| | |
|---|---|
| Methyl Isobutyl ketone | 76.5% |
| Polyvinyl acetate - crotonic acid copolymer (Gelva C5V10) | 5.0 |
| Nevillac Hard Resin | 2.0 |
| Ethylene Glycol Ethyl Ether | 2.5 |

EXAMPLE 5-continued

| | |
|---|---|
| N-Methyl-2-Pyrrolidone | 2.5 |
| Water | 5.0 |
| Methyl Alcohol | 5.0 |
| Solvent soluble ionizable salt (potassium thiocyanate) | .75 |
| Methyl Violet Base | .75 |

The ingredients are combined as in the previous example to form a solution. The ink composition has good jet printing characteristics and good adhesion to metal and plastic surfaces, including surfaces coated with a mold release agent.

The jet printing ink compositions of Examples 1 to 5 meet the requirements for jet printability, namely, a viscosity within the range of 1.5 to 10 cps and preferably within the range of 2.0 to 6.0 cps; ink resistivity below 2000 ohm-cm and preferably below 1000 ohm-cm; surface tension below 28 dyne/cm; a velocity of sound of the ink composition, insuring proper nozzle resonance, of 1200–1700 m/sec. The ink compositions are filtered to remove insolubles greater than 5 microns and preferably greater than 2 microns in size.

Rub resistance of the dried ink composition is measured by rubbing the dried ink image with the thumb wet and dry. For good rub resistance, the dried characters should resist removal by three hard rubs wet and dry.

The coloring component of the ink compositions of this invention is limited to dyestuffs which are soluble in ketone, with or without small amounts of water when present, alcohol when present, and the dissolved ionizable salt. Representative of such ketone soluble dyestuffs are Methyl Violet Base Dyes (C. I. solvent Violet 8), Rhodemine B Base Dyes (C. I. solvent Red 49), and the like. It is sufficient to make use of a dye component or mixture of dye components in a concentration of 0.25% by weight or more and preferably in an amount within the range of 0.5 to 2.0% by weight.

In the above examples, the N-methyl-2-pyrrolidone and ethanol aid dye solubility and promote water tolerance of the ink composition. They may be replaced by other pyrrolidones and lower alcohols. When present, the pyrrolidones are employed in an amount within the range of 0 to 4% and preferably 1 to 3% by weight of the ink composition, and the lower $C_1$ to $C_5$ alcohols are employed within the range of 0 to 8% and preferably 2 to 6% by weight of the ink composition.

The diethylene glycol ethyl or other glycol ethers serve as an agent to control drying rate. For this purpose, such glycol ethers may be employed in an amount within the range of 0 to 4% by weight and preferably 1 to 3% by weight.

It will be understood that changes may be made in the details of formulation of the ink composition without departing from the spirit of the invention, especially as defined in the following claims.

We claim:

1. An ink composition for jet printing onto non-porous non-absorbent surfaces comprising a solvent component the major portion of which is one or more organic ketones present in an amount of at least 64% by weight of the ink composition, and in which water may be present in an amount that does not exceed 10% by weight, a soluble ionizable salt present in solution in an amount within the range of 0.25 to 2.0% by weight, and an organic dyestuff soluble in the solvent component and present in an amount of at least 0.25% by weight, said ink composition having a viscosity within the range of 1.5 to 10 cps, a resistance less than 2000 ohm-cm, a surface tension of less than 28 dynes/cm, a velocity of sound within the range of 1200–1700 m/sec, and no particles having a dimension greater than 5 microns.

2. An ink composition as claimed in claim 1 in which the soluble ionizable salt is present in an amount within the range of 0.5 to 1.0% by weight.

3. An ink composition as claimed in claim 1 in which the soluble ionizable salt is selected from the group consisting of an alkali metal and alkaline earth metal halide, nitrate, thiocyanate, acetate and propionate.

4. An ink composition as claimed in claim 1 in which the ketone solvent is selected from the group consisting of $C_2$ to $C_{10}$ aliphatic ketones and up to $C_{10}$ alicyclic ketones.

5. An ink composition as claimed in claim 1 in which the soluble dyestuff is present in an amount within the range of 0.5 to 2.0% by weight.

6. An ink composition as claimed in claim 1 which includes water in an amount up to 10% by weight.

7. An ink composition as claimed in claim 6 in which the water is present in an amount within the range of 0 to 5% by weight.

8. An ink composition as claimed in claim 1 which includes a $C_1$ to $C_5$ alcohol in an amount up to 8% by weight.

9. An ink composition as claimed in claim 8 in which the alcohol is present in an amount within the range of 2 to 6% by weight.

10. An ink composition as claimed in claim 1 which includes pyrrolidone in an amount up to 4% by weight.

11. An ink composition as claimed in claim 10 in which the pyrrolidone is N-methyl-2-pyrrolidone and is present in an amount within the range of 1 to 3% by weight.

12. An ink composition as claimed in claim 1 which includes a glycol ether in an amount up to 4% by weight.

13. An ink composition as claimed in claim 1 which includes a vinyl acetate copolymer resinous binder present in an amount up to 6% by weight.

14. An ink composition as claimed in claim 13 in which the binder is present in an amount within the range of 2 to 4% by weight.

15. An ink composition as claimed in claim 13 in which the vinyl acetate copolymer resinous binder is selected from the group consisting of vinyl acetate — vinyl chloride copolymer and vinyl acetate — crotonic acid copolymer.

* * * * *